Inventor.
G. S. Ramsburg
By Mason Fenwick & Lawrence,
Attorneys.

UNITED STATES PATENT OFFICE.

GEORGE S. RAMSBURG, OF SOMERSWORTH, NEW HAMPSHIRE.

FOLDABLE RECEPTACLE.

1,335,701.  Specification of Letters Patent.  Patented Mar. 30, 1920.

Application filed April 23, 1917. Serial No. 164,022.

*To all whom it may concern:*

Be it known that I, GEORGE S. RAMSBURG, a citizen of the United States, residing at Somersworth, in the county of Strafford and State of New Hampshire, have invented certain new and useful Improvements in Foldable Receptacles; and I do hereby declare the following to be a full, clear, and exact description of the invention, such as will enable others skilled in the art to which it appertains to make and use the same.

This invention relates to receptacles, and more particularly to a knock-down and foldable flower pot.

It is one of the objects of the present invention to provide a flower pot or receptacle made of an integral piece of foldable material which is provided with suitable subdivisions or sections which when the blank is folded into proper position will form a bottom, side members and double end construction, and it is a particular object of the present invention to provide an interlocking and foldable receptacle or flower pot which may be made of a piece of material using the minimum amount of stock in the formation of the blank, and which blank is provided with relatively short interlocking members or flaps which are so designed that they may be readily interlocked with each other through a simple movement.

A further object of the present invention is to provide a foldable receptacle or box having double end wall construction, and to provide means whereby the end wall members are securely and readily interlocked in overlapping position thereby preventing the soil within the box or container from passing outwardly, thus forming a plant box which, when filled, may be carried about and set separately upon a shelf or upon soil, and further to provide a box structure in which the members are so relatively interlocked that relatively tight joints are made and the filling of the boxes facilitated either by suitable implements or by hand.

Another object of the present invention is to provide a foldable receptacle or plant box in which the interlocking members are particularly designed so that the interlocking of the overlapped members may be readily accomplished, and which box is provided with means affording ample drainage of moisture from the box and yet which is of such construction as to prevent the entrance of earth worms or the like when the box is set upon soil.

With the above and other objects in view as will be rendered manifest in the following specification, my present invention consists in a plant box preferably constructed of a single piece of foldable material, such as pasteboard, and which sheet of material is subdivided into a number of relatively foldable sections provided with means whereby the folded or assembled members of the box may be suitably, readily and efficiently interlocked for use.

One embodiment of the invention is described in the following specification and illustrated in the accompanying drawings in which.

Figure 1:
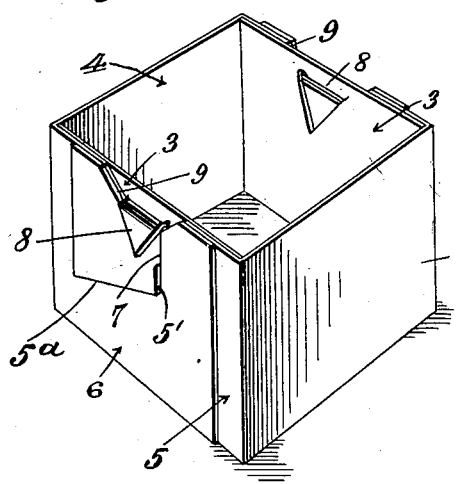
Figure 1 is a perspective view of the completely assembled and interlocked members of the plant box.

The receptacle as herein disclosed comprises a single sheet of material, preferably of pasteboard of suitable characteristics, and which may be readily folded, the blank comprising a central portion 2 forming the bottom of the folded box, the parallel sides of the bottom being scored along lines 2' to provide for the upwardly folding of end walls 3 of suitable proportion, the size of the blank being such as to produce, when the several members are folded, a substantially cubical box, although it is understood that any other form of box may be provided for as desired. Integrally connected to the opposite parallel edges of the bottom 2 along scored lines 2ª thereof there are shown side members or walls 4, these in turn being provided along their parallel edges in alinement with the scoring 2' of the bottom 2 with score lines 4' to which are joined the outer end walls or flap members 5 and 6. The end flap members 6 of the side walls 4 are shown as relatively diagonally disposed as to the base or bottom 2 and the end members 5 of each of the side walls 4 are similarly diagonally disposed.

Figure 2:
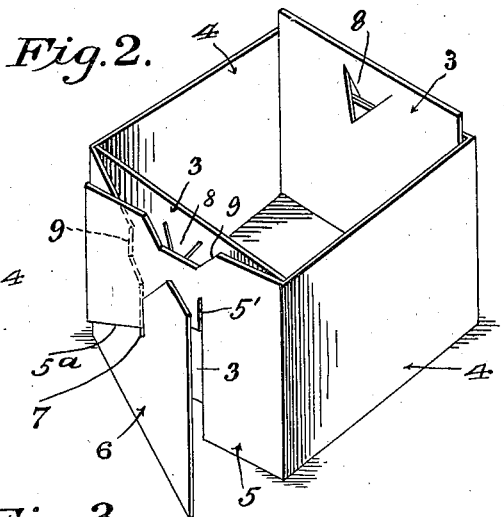
Fig. 2 is a perspective view of the receptacle in the process of assembling and interlocking.
Figure 3:
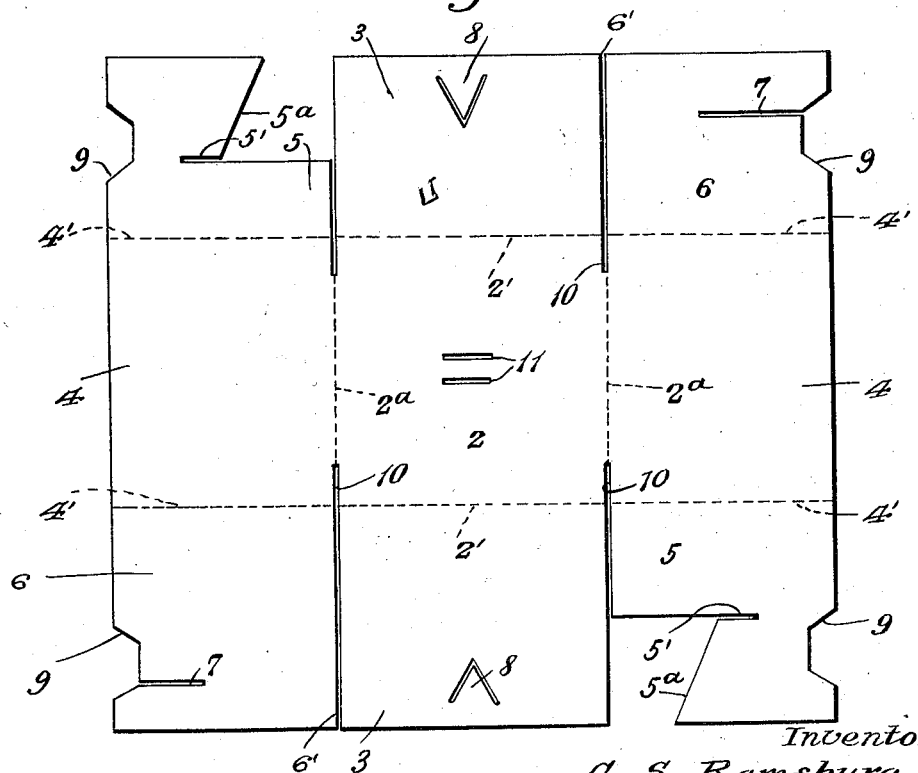
Fig. 3 is a plan view of the knock-down box in the expanded condition prior to folding and arrangement for shipping.

In practice when it is desired to erect the box from the flat blank illustrated in Fig. 3, the end walls 3—3 are folded upwardly to a substantially perpendicular position, and the side members 4 are then folded upwardly and the flaps 5 and 6 contiguous to one of the end walls 3, as shown in Fig. 2, are then folded toward each other in overlapping position upon the adjacent end wall 3 and interlocked. In the present invention this interlocking is provided for by slitting the end flap 6 along a line 7 to a suitable distance from its top edge downwardly, and somewhat adjacent the outer edge 6' of the flap 6, while the coördinate flap 5 is shown as cut away adjacent one corner to form a tongue and provided with a slit 5' extending upwardly from the angularly cut-away edge 5ª which angular edge forms a point between it and the end edge of the tongue adapted to be passed through the slot 7 of the flap 6 as these two are brought into relative interlocking position until the slot 7 and the slot 5' come into alinement with each other, whereupon the flap 6 is pushed upwardly and the flap 5 pushed downwardly until these members are brought into complete overlapping and interlocking position as shown in Fig. 1, the edges of the respective slots 7 and 5' of these end members preventing their relative lateral movement but providing for a relative swinging or pivotal movement during the interlocking or disengaging action in assembling or disassembling the members of the box. In a similar manner the opposite inner end wall 3 is brought into a vertical position and the respective end flaps 5 and 6 which are provided with interlocking means similar to the opposite end flaps are brought into interlocking and overlapping position upon the adjacent inner end wall 3. For the purpose of interlocking each end wall 3 with its respective overlapping and interlocking flaps 5 and 6 on the end walls 4 suitable means may be provided, and as here shown each of the end walls 3 is provided with a tongue 8 which is illustrated as of triangular form, the point of which is directed downwardly or toward the bottom 2 of the box, these tongues being adapted to be sprung outwardly as shown in Fig. 2 over the upper contiguous edges of the interlocked flaps 5 and 6, which edges preferably are shown as indented or recessed at 9 so that the base or root of the interlocking tongue 8 substantially abuts against the upper or horizontal edge of the interlocking recess 9 in the end flaps. The width of this recess in each of the flaps is approximately equal to the width of the base of the tongue where it joins the end 3, thus providing for a substantial interlock against lateral movement of the ends of flaps 5 and 6, when they have been overlapped by the outwardly passed tongue 8.

To provide for the ready interlocking of the securing tongue 8 over the overlapping and interlocked flaps 5 and 6, the end walls 3 are adapted to be sprung or lifted upwardly relatively to the side walls 4 to a sufficient degree to carry the point of the tongue over the edge 9 of the recess of the end flaps 5 and 6, and this movement is facilitated by slitting the bottom 2 contiguous to the score line a—a as indicated at 10 for a suitable distance inwardly along the score line, and thus providing for the flexure of the bottom 2 and allowing for the end members 3 to be lifted or sprung upwardly and permitting the locking tongue 8 to be readily passed over the adjacent interlocked and overlapped flaps 5 and 6.

From the foregoing it will be seen that I have provided a receptacle or plant box having a double end wall construction and one in which there is provided a minimum number of crevices thereby eliminating the possible ingress of earth worms and the like. The slits 10 which are provided to enable the upward movement of the end walls 3 also provide for drainage of moisture from within the plant pot or receptacle and if necessary the bottom 2 may be provided with a suitable number of perforations or slits as at 11 to give further drainage.

It will be noted that the box is formed from an integral piece of material which is substantially rectangular in form and is thus most economical in the use of stock in the manufacture of the boxes. The receptacles may be shipped in knocked-down form, occupying thus minimum space, and may be compactly arranged and protected against injury. When desired the blanks are removed from their pack and individually folded as above described to produce the receptacle when it is desired to utilize the latter as a plant pot, for instance, which may be filled with earth for plant propagating purposes.

The angularly cut edges 5ª of the flaps 5 enable the assembling of the coördinate flaps with an easy action, the incline having a drawing or folding reaction on the opposite flap 6 as it bears on the bottom of the slit 7 thereof, this greatly facilitating the folding of the box-pot. In the form disclosed the end flap 5 is closed upon the other by movement in the right hand as shown in Fig. 2.

What I claim is:

A plant box-pot formed of a substantially rectangular sheet, said box-pot having a rectangular bottom, inside walls rising from opposite sides of the bottom, side walls rising from the other two parallel sides of the bottom, flaps on opposite ends of the said last mentioned side walls, said flaps being foldable over the outer sides of said inside walls and interlocking with each other and having their upper edges provided with indentations, one of said foldable flaps of each interlocking pair having cut away corners leaving a tongue with a lower inclined edge, the other flap of each interlocking pair having a slit extending from its upper edge adapted to receive the tongue of the flap with which it interlocks, and a tongue struck from each of said inside walls adapted to hold the folded interlocked flaps closely against said inside walls by engaging over the flaps through the said indentations.

In testimony whereof I affix my signature.

GEORGE S. RAMSBURG.